US011936799B2

(12) United States Patent
Xu et al.

(10) Patent No.: US 11,936,799 B2
(45) Date of Patent: Mar. 19, 2024

(54) BLOCKCHAIN-BASED TIME STAMPING METHOD FOR DIGITAL SIGNATURE

(71) Applicant: University of Electronic Science and Technology of China, Chengdu (CN)

(72) Inventors: Chunxiang Xu, Chengdu (CN); Chuang Li, Chengdu (CN); Yuan Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 279 days.

(21) Appl. No.: 17/032,041

(22) Filed: Sep. 25, 2020

(65) Prior Publication Data
US 2021/0099315 A1 Apr. 1, 2021

(30) Foreign Application Priority Data
Sep. 27, 2019 (CN) .......................... 201910929365.5

(51) Int. Cl.
H04L 29/06 (2006.01)
H04L 9/32 (2006.01)
H04L 9/00 (2022.01)

(52) U.S. Cl.
CPC .......... H04L 9/3297 (2013.01); H04L 9/3236 (2013.01); H04L 9/3247 (2013.01); H04L 9/50 (2022.05)

(58) Field of Classification Search
CPC ... H04L 9/3297; H04L 9/3236; H04L 9/3247; H04L 9/50; H04L 9/3239; H04L 2209/805; H04L 9/3242; H04L 9/083
See application file for complete search history.

(56) References Cited

U.S. PATENT DOCUMENTS 11,102,244 B1 * 8/2021 Jakobsson ............... H04L 51/42
2017/0046651 A1 * 2/2017 Lin ..................... G06Q 10/0631
(Continued)

FOREIGN PATENT DOCUMENTS

CN 108566398 A 9/2018
CN 109034805 A 12/2018
(Continued)

OTHER PUBLICATIONS

Hao Hu, Design and Development of Voting System Based on Blockchain, Jan. 15, 2018, pp. 1-69, China Master's Theses Full-text Database, China.
(Continued)

Primary Examiner — Taghi T Arani
Assistant Examiner — Lin Chang
(74) Attorney, Agent, or Firm — MATTHIAS SCHOLL P.C.; Matthias Scholl

(57) ABSTRACT

A method for blockchain-based time stamping for digital signature is disclosed. The method includes two participants: a signer who signs a message, a verifier who verifies the message. In the method, the signer obtains hash values of a certain number of latest confirmed blocks in blockchain, binds these hash values and the message together to be a new message. The signer then generates a signature of the new message and inserts identification data of this signature and the new message into a transaction of blockchain. This method ensures that the generation time of the signature is prior to the generation time of the block which contains the signature and, at the same time, is after the generation time of the blocks whose hash values are included in the signature, which produces an accurate time interval for the digital signature.

5 Claims, 2 Drawing Sheets

(56) References Cited

U.S. PATENT DOCUMENTS

| | | | | |
|---|---|---|---|---|
| 2018/0293557 | A1* | 10/2018 | Kim | G06Q 20/3825 |
| 2019/0079950 | A1* | 3/2019 | Ramabaja | G06F 16/1805 |
| 2019/0235946 | A1* | 8/2019 | Guo | H04L 67/1097 |
| 2019/0278921 | A1 | 9/2019 | Unitt | |
| 2019/0311358 | A1* | 10/2019 | Bhagavatha | G06Q 20/389 |
| 2019/0311392 | A1* | 10/2019 | Swamidurai | H04L 63/0442 |
| 2020/0042513 | A1* | 2/2020 | Shima | G06F 16/2379 |
| 2020/0117733 | A1* | 4/2020 | Mueller | G06F 16/258 |
| 2020/0134565 | A1* | 4/2020 | Adluri | G06F 16/182 |
| 2021/0097532 | A1* | 4/2021 | Mahasuverachai | G06Q 20/401 |
| 2021/0135854 | A1* | 5/2021 | Karame | H04L 9/3247 |
| 2021/0263907 | A1* | 8/2021 | Krueger | G06F 16/2315 |

FOREIGN PATENT DOCUMENTS

| | | |
|---|---|---|
| CN | 109508984 A | 3/2019 |
| CN | 109784005 A | 5/2019 |
| CN | 110061843 A | 7/2019 |
| JP | 2004260664 A | 9/2004 |

OTHER PUBLICATIONS

Sujata Mohanty et al., A Timestamped Signature Scheme with Message Recovery, 2014 International Conference on High Performance Computing and Applications (ICHPCA), Dec. 2014, pp. 1-4, IEEE, United States.

* cited by examiner

BLOCKCHAIN-BASED TIME STAMPING METHOD FOR DIGITAL SIGNATURE

CROSS-REFERENCE TO RELATED APPLICATIONS

Pursuant to 35 U.S.C. § 119 and the Paris Convention Treaty, this application claims foreign priority to Chinese Patent Application No. 201910929365.5 filed Sep. 27, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to cryptographic protocols and, more particularly, to a blockchain-based time stamping protocol for digital signature.

Time stamp of a digital signature is the proof that the digital signature is created at a certain time. Time stamp is an essential tool in digital forensics processes. For example, when there is a patent application conflict, a common method to judge which is the prior one is to compare the creation time of the invention. Evidence of creation time may be stored by the owner himself or proved by a third party. However, there are conditions that the owner or the third party re-signs or regenerates the later application for an earlier time. Therefore, people often challenge the credibility of the generation time of the signature. To be credible, one method is to send a copy of the patent or a hash value of the patent to a trusted third party which could prove the date when the patent, or the hash value of the patent, was received. Another method for time stamping a digital signature is to time-stamp the patent with a central timestamping authority (TSA). In this case, the TSA signs the hash value of the patent with a time stamp; the public key of the TSA is easy to derive; thus, the signature of the TSA is easy to verify. A similar method is to sign the patent with a transient key that is changed every time interval. An improvement of the above methods is to time-stamp the patent with a TSA whose signature key is changed every time interval. In this case, the signature of the patent with time stamp is signed by several trusted servers. These time-stamping procedures still face the same problem. Third parties can re-sign or re-generate signatures of any time, since the private key of the signature is owned by them. The generation of the time stamp is still dependent on third parties. Therefore, a time-stamping procedure for digital signature should satisfy the following properties: The time stamp of a digital signature can be verified by anyone. The time stamp of a digital signature should be independent of any physical device and any third institutions. It must be impossible to change a single bit of the time stamp of a digital signature after the time stamp is established. One method we came up with for time-stamping a digital signature would be to record the time-stamped signature information on blockchain. Concretely, the method is that embedding the time-stamped signature information in a transaction of a block in blockchain. Blockchain is a decentralized distributed ledger where blocks are connected through their hash values to ensure the order of them. Each block of the blockchain contains its generation time and a set of transactions that record transfer records and some extra data. In this case, the time stamp of the digital signature would be the generation time of the block. Note that the transaction that contains the time-stamped signature also has a time which is known as locktime, but the locktime of the transaction is not used to record the generation time of the transaction. Once recorded in the blockchain, the time stamp of the digital signature is independent of any physical device, is able to be verified and cannot be changed. However, this method can only ensure that the generation time of the digital signature is prior to the generation time of the block, while it cannot confirm the earliest generation time of the digital signature. Therefore, this method fails to distinguish the order of the production time of the digital signature, and cannot distinguish that which is the prior one of the two patent applications in the above case. An improvement of this method is to contain a hash value of the latest confirmed block in the blockchain. In this case, the time stamp of the digital signature would be an interval, which is prior to the generation time of the block that containing this signature and is later than the generation time of the block contained by this signature. This provides an order of the production time of the digital signature. Moreover, the interval of the time stamp depends on (is equal to, in most cases) the time interval of block generation. When the time interval of block generation becomes smaller, the interval of the time stamp will be smaller. However, according to the previous research findings, the latest confirmed block is still at risk of being replaced by another block, which leads to a result that the time stamp cannot confirm the earliest generation time of the digital signature.

SUMMARY

The disclosure is a blockchain-based time stamping protocol for digital signatures so that the time stamp of the digital signature can be verified and cannot be modified. The method is based on a blockchain (BC). In the BC, blocks are generated at regular intervals on average; each block contains its generation time; and the hash value of one block is easy to acquire. According to the disclosure, when a signer needs to sign a digital message, the signer acquires hash values of a certain number of latest confirmed blocks in BC, generate a new message containing the hash values and the message to be signed and signs the new message. Finally, the signer embeds hash value of the signature into a transaction, and sends the transaction to the BC. Once the transaction is recorded in the BC, the time stamp of the digital signature is generated. The time stamp in this disclosure is a time interval, which starts from the generation time of the latest block that the signature contains and ends at the generation time of the block containing the transaction which contains the hash value of the signature.

DETAILED DESCRIPTION OF THE EMBODIMENT

Figure 1:
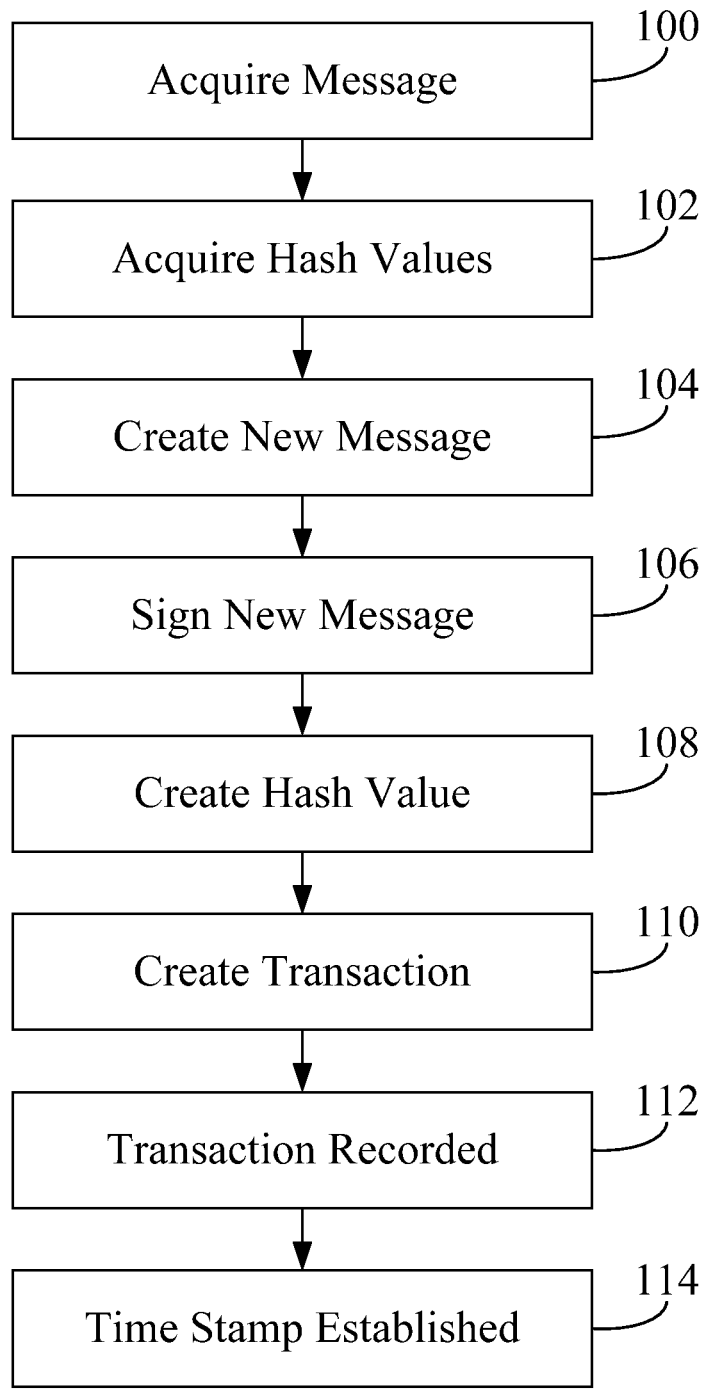
FIG. 1 is a flow diagram illustrating a time stamping method of the disclosure.

FIG. 1 is a flow diagram illustrating the general process of time stamping a digital signature. The signer acquires the message M to be signed at step 100. The message M can be a digital bit string of arbitrary length and can compromise any alphanumeric, audio, or graphic presentation. The message M can be generated by another party or generated by the signer himself. At step 102, the signer accesses to the BC to fetch a certain number n of latest confirmed consecutive blocks and get these blocks' hash values, sorted in order of generation time, that are denoted by $H_{B1}, H_{B2}, \ldots, H_{Bn}$. If the signer is not able to access to the BC, he can ask a blockchain node that synchronizes all data on BC for the blocks and hash values. Hash values are generated by a one-way hash function. A hash function is a function that takes as input a bit string of arbitrary length and outputs a bit string of fixed length, called hash value. Each blockchain would declare what kind of hash function it selects to generate the hash values of blocks. Any known public blockchain whose consensus mechanism is Proof-of-work (PoW), such as the Bitcoin, Ethereum and Monero, can be used as a BC in the disclosure. A confirmed block in the BC is a block after which there are at least a certain number t blocks containing the hash value of the block directly or indirectly. t changes along with the change of blockchain. For instance, t=6 in Bitcoin and t=12 in Ethereum. Every public blockchain with PoW consensus would declare that a block is confirmed when there are at least a certain number t blocks after this block. In the disclosure, we set n≥t. The advantage to fetch n latest confirmed blocks rather than the latest confirmed block is as follows. The latest confirmed block can be replaced by a new block with non-negligible probability, while the probability that n latest confirmed blocks are all replaced is negligible according to previous academic work of Badertscher et al. Once the latest confirmed block is replaced, the beginning of the interval of time stamp will be invalid. When the signer fetching n latest confirmed blocks, the beginning of the interval of time stamp is invalid with negligible probability. At step 104, the signer combines hash values $H_{B1}, H_{B2}, \ldots, H_{Bn}$ with message M and gets a new message $M_{new}$. A simple method is linking the hash values to the back of the message, in this case, the new message is $M_{new}=M\|H_{B1}\|H_{B2}\| \ldots \|H_{Bn}$ where $\|$ is the connection symbol. For the remaining description of the invention, it will be assumed that the new message $M_{new}$ has been generated by the signer. The signer then calculates the hash value, denoted by $H_M$, of message $M_{new}$ using a one-way hash function, denoted by $h_1$. Any known hashing function, such as the SHA-256, MD5 and RIPEMD-160 can be used as $h_1$. At step 106, the signer signs message $H_M$ and gets a valid signature S. A signature is generated by a signing algorithm that takes a fixed-length bit string as input and outputs a new fixed-length bit string, called a signature, denoted by S. A signature is verified by a verifying algorithm that takes a fixed-length bit string as input and outputs a bit 0 or 1 where 0 means the signature is invalid and 1 means the signature is valid. Any known secure signature algorithms, such as the RSA, DSA and ECDSA, can be used in the disclosure. Ring signature algorithms, group signature algorithms and zero-knowledge proofs can also be used in the disclosure. When there are at least two signers who need to generate the signature in company, threshold signature algorithms and multi-signature algorithms can also be used in the disclosure. At step 108, the signer generates the hash value $H_T$ of signature S and message $M_{new}$ using a one-way hash function, denoted by $h_2$. The processes of selecting $h_2$ and $h_1$ are independent. Any known hashing function can be used as $h_2$. At step 110, the signer generates a transaction Trans that contains $H_T$. To generate a valid transaction, the signer needs to generate a valid address on the BC first. A transaction of the BC is a record of transfer information. In a transaction there exists a place that can be filled with arbitrary information and the signer fills this place with $H_T$.

Figure 2:
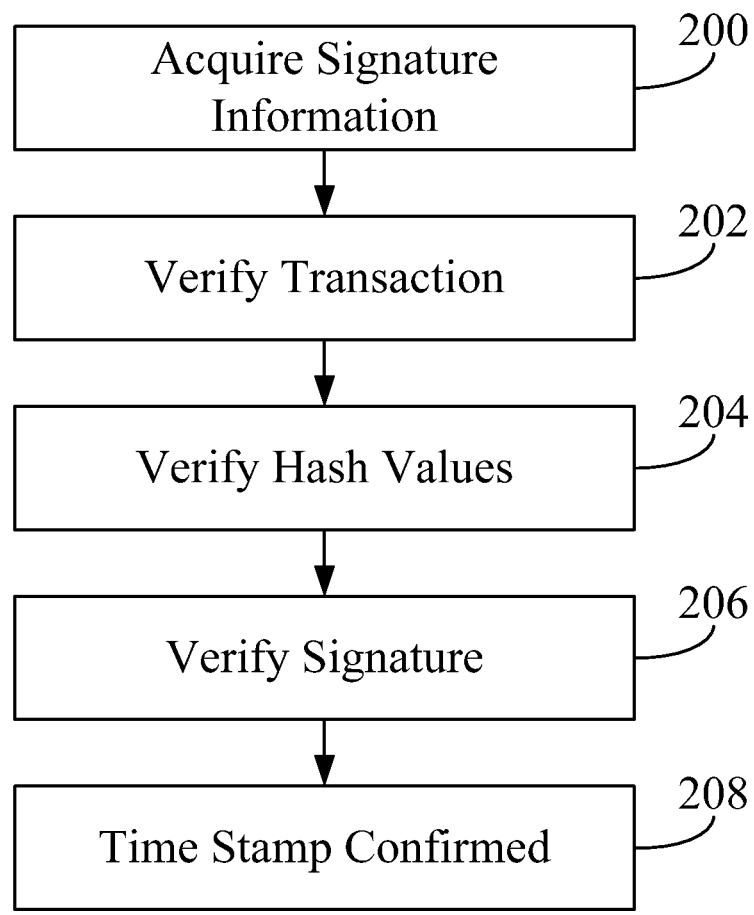
FIG. 2 is a flow diagram illustrating a time-stamp verification method of the disclosure.

In a blockchain, this place is sufficient enough to be filled with several hash values. It is allowed for the signer to fill this place with multiple hash values that are generated by different signatures. It is also allowed for the signer to send HT to a blockchain node that owns a valid address on the BC. In this case, it will be assumed that $H_T$ has been sent to the blockchain node by the signer and this blockchain node will perform step 110 instead of the signer. After step 110, the signer (or the blockchain node) gets a valid transaction $T_{rans}$. At step 112, the signer (or the blockchain node) sends $T_{rans}$ to the miners of BC. A miner of BC is a node that spends computation cost to generate new blocks on BC. On receiving $T_{rans}$, miners will include $T_{rans}$ to generate a new valid block, denoted by BL. Once BL is generated, BL will be sent to other miners and all the miners will work to generate blocks containing the hash value of BL. $T_{rans}$ is recorded when BL is confirmed in BC. At step 114, if step 112 isn't performed by the signer, the signer acquires BL with the help of the blockchain node; otherwise, the signer acquires BL himself. The signer computes BL's hash value, denoted by $H_{BL}$ and $T_{rans}$'s hash value, denoted by $H_{Tr}$. Then the time-stamped signature is established. We denote the generation time of BL by TBL, denote by $T_{BLC}$ the latest confirmed one of the blocks whose hash value is contained by $M_{new}$. The time stamp of M's signature is interval ($T_{BLC}$; $T_{BL}$), which indicates that the generation time of the signature is later than $T_{BLC}$ and is prior to $T_{BL}$. Concretely, verification of time stamp interval is described next, which is also shown in FIG. 2. Finally, the signer stores $M_{new}$, S, $H_{BL}$, $H_{Tr}$. At step 200, the verifier gets signature information $M_{new}$; S; $H_{BL}$; $H_{Tr}$ from the signer. The verifier would access to BC to acquire the block BL whose hash value is $H_{BL}$. In this step, if the verifier cannot access to BC, he can also ask a blockchain node for the block whose hash value is $H_{BL}$. Then the signer checks whether $H_{BL}$ is the hash value of a block in BC and whether $H_{Tr}$ is the hash value of a transaction in this block at step 202. If both answers are yes, the verifier stores generation time $T_{BL}$ of block BL and continues to execute next steps; otherwise, the signature information is considered to be invalid. At step 204, the verifier derives hash values $H_{B1}, H_{B2}, \ldots, H_{Bn}$ from $M_{new}$. The verifier would access to BC or ask a blockchain node to acquire the blocks whose hash values are $H_{B1}, H_{B2}, \ldots, H_{Bn}$. If there are some hash values cannot be found in BC, the hash values are marked as invalid hash value and others are marked as valid hash value. The verifier derives the invalid hash value $H_{Bi}$ who ranks first and the valid hash value $H_{Bi-1}$ who sorts before this block and next to it. The verifier then checks whether the blocks whose hash values sorts before $H_{Bi}$ are consecutive. If there is only one block that satisfies the condition, we count this as consecutive. If so, the verifier gets the generation time, denoted by $T_{BLC}$, of the block with hash value $H_{Bi-1}$. If there is no hash value before $H_{Bi}$, the signature information is considered to be invalid. At step 206, the verifier verifies the validation of signature S with the corresponding verifying algorithm. If the output is 0, the signature information is considered to be invalid; otherwise, the verifier continues to step 208. If the signature information hasn't been considered to be invalid after executing the above steps, the verifier comes to conclusion that the signature is valid, and the time stamp of the signature is ($T_{BLC}$; $T_{BL}$). In the event judging which is the first one of two patent applications, the time stamps of the two patent applications can be used to prove that one is prior to the other one. If the two intervals of time stamps have an overlapping part, our invention cannot distinguish which is earlier. To avoid this situation, the time interval should be as small as possible by selecting a blockchain with a small-time interval of block generation. For example, the time interval of block generation in Ethereum is about 12 seconds. Thus, the interval of a signature is also about 15 seconds according to previous work of Wood et al., which is sufficient to meet the needs of patent applications. The time-stamping procedures described herein may be implemented using general purpose programmable computers. A signing program running on a user's computer could perform all the steps in FIG. 1. A verifying program running on another user's computer could perform all the steps in FIG. 2. If there is a need for a blockchain node, the interface provided by the existing blockchain can be used without modification. The disclosure may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

It will be obvious to those skilled in the art that changes and modifications may be made, and therefore, the aim in the appended claims is to cover all such changes and modifications.

What is claimed is:

1. A method for generating a timestamp for a digital signature based on a blockchain, the method comprising:
    acquiring a message;
    obtaining hash values of latest confirmed n blocks; wherein n≥12 in Ethereum and n≥6 in Bitcoin;
    generating a new message by combining said message with said hash values of said latest confirmed n blocks;
    signing said new message and generating a signature;
    generating a hash value $H_T$ by hashing said new message and said signature;
    generating a transaction by embedding the hash value $H_T$ with a valid address on the blockchain;
    sending said transaction to blockchain miners and generating and confirming a transaction block containing said transaction; and
    establishing a timestamp for said signature, wherein said timestamp is an interval between the generation time of the latest one of said latest confirmed n blocks and the generation time of the transaction block.

2. The method of claim 1, wherein said latest confirmed n blocks are blocks that are confirmed in the blockchain.

3. The method of claim 1, wherein said signature is derived by application of a signing algorithm.

4. The method of claim 1, wherein said hash values of said latest confirmed n blocks are derived by application of a one-way hash function.

5. The method of claim 1, wherein said blockchain miners are nodes spending computation cost to generate new blocks on the blockchain.

* * * * *